Nov 24, 1970  W. J. HILL  3,543,200
MAGNETIC, ELECTRIC SIGNAL CHOPPER
Filed Aug. 12, 1968  7 Sheets-Sheet 1

INVENTOR
WALLACE JAMES HILL

INVENTOR

WALLACE JAMES HILL

Nov 24, 1970  W. J. HILL  3,543,200
MAGNETIC, ELECTRIC SIGNAL CHOPPER
Filed Aug. 12, 1968  7 Sheets-Sheet 6

INVENTOR

WALLACE JAMES HILL

Nov. 24, 1970  W. J. HILL  3,543,200
MAGNETIC, ELECTRIC SIGNAL CHOPPER
Filed Aug. 12, 1968  7 Sheets-Sheet 7

INVENTOR

WALLACE JAMES HILL

United States Patent Office 3,543,200
Patented Nov. 24, 1970

3,543,200
MAGNETIC, ELECTRIC SIGNAL CHOPPER
Wallace J. Hill, Warwickshire, England, assignor to Tudor Control Systems Limited, Finham, Coventry, England
Filed Aug. 12, 1968, Ser. No. 752,070
Int. Cl. H01h 3/02
U.S. Cl. 335—72                                      17 Claims

ABSTRACT OF THE DISCLOSURE

A magnetically-acting, electric signal chopper includes a contact unit arranged in a space between the adjacent ends of a fixed magnet and of a movable magnet which becomes aligned with the fixed magnet when the former passes the latter. The contact unit comprises resilient conductive reeds having their one ends overlapping and their other ends connected to the circuit carrying the signal. The resilience of the overlapping ends of the reeds normally bias them into engagement with each other; and they are separated by the interaction of the fluxes of the two magnets with their bias.

---

This invention relates to a magnetically-operating, electric signal chopper, and has for its main object to enable a D.C. or an A.C. signal in a circuit, to be chopped into a rectangular or square wave form in a simple and efficient manner.

According to the present invention, a magnetically-acting, electric signal chopper includes a magnet arranged to be moved in a direction perpendicular to its axis and to the axis of a fixed magnet with which it becomes aligned, with a space between them, during its movement, and a contact unit of which the electrodes are in the form of substantially aligned reeds, of temporarily magnetisable material, which have their one ends overlapping and biased apart, and their other ends fixed and for inclusion in an electric circuit carrying the signal to be chopped, the contact unit arranged in the space between the adjacent ends of the fixed and movable magnets and directed to be swept by the flux from the movable magnet so as to be opened and closed by the interaction of the fluxes of the two magnets with the biased reeds.

The reeds can be arranged in the space for their planes to be at right-angles to the axis of the fixed magnet, or parallel thereto, and for the flux from the movable magnet either to sweep along their lengths or across their widths.

The action of the signal chopper relies upon the reeds being temporarily magnetisable, but there is no objection to them having a permanently magnetisable characteristic provided that the temporarily magnetisable characteristic predominates.

According to a further feature there is more than one movable magnet, the movable magnets being spaced laterally of their direction of movement and coacting with respective fixed magnets with respective ones of the contact units between them, whereby to vary the number of chops effected.

In such a case and according to a still further feature, such an arrangement is given greater flexibility by mounting for simultaneous movement in each of two or more laterally spaced paths a different number of movable magnets, with associated fixed magnets and respective contact units in the space between them, and feeding the signal from the electric circuit to be chopped through a pulse selection and integration device. By these means alternative frequencies of the pulses to be applied to the electric circuit can be selected at will.

Also in such a case, and when the movable magnets are mounted from a driven rotor, the latter, according to a still further feature, is driven through speed-increasing gearing of which at least one wheel drives a movable magnet, with an associated fixed magnet and a contact unit in the space between them, at a slower speed than the rotor and feeds the electric circuit to be chopped through the pulse selection and integration device. This provides at least one series of chops at a lower frequency.

According to yet another feature the signal chopper has a driven input shaft which is connected to drive the output wheel of at least one planar gear pair at a different speed, and each wheel of the pair has at least one of the movable magnets to coact with one or more fixed magnets during its rotation, with respective contact units in the space between them. In this way a plurality of pulses can be generated for each revolution of the input shaft.

In such a case, and when there are more than one gear pair, the gear pairs can be constituted by a common input gear wheel fast with the shaft and individual output gear wheels meshed with it at different positions along its periphery. Alternatively, the input gear wheels of the pairs can be made fast with the input shaft in different axial positions along the latter.

Also in such a case the output gear wheel of at least one of the gear pairs can be arranged to drive an additionl unequal gear wheel, or train of unequal gear wheels each provided with a movable magnet to coact with respective fixed magnets, with contact units in the spaces between them, to provide pulses at different frequencies.

When such a train of unequal gear wheels is arranged to be driven in this way their contact units can be connected for the pulses they generate to operate respective switches which are connected in series with each other, and for the relative sizes of the wheels in the train to be such that only in a predetermined multiple of revolutions of the input shaft are pulses generated in unison to operate all of the switches simultaneously.

Accordng to another feature the signal chopper has an input shaft which drives a rotor, in accordance with the invention, through a speed-increasing gearing so as to provide one or more multiples of pulses for each revolution of the input shaft, and the latter also drives one or more gear pairs to provide pulses for multiples of revolutions of the input shaft.

According to yet another feature a signal chopper, in accordance with the invention, is combined with another entity (e.g. a machine tool) to provide signal pulses which actuate controls for the latter, and, in some instances, indexes for indicating the extent to which the controls have operated (e.g., the length of travel of a moving part of the entity).

According to a still further feature the, or each (as appropriate) movable magnet is supported from a rotor and the reeds of each contact unit are parallel to a tangent to the path of the movable magnet with which they coact. The movable magnet (or magnets, as appropriate) may be of the permanent bar type, or they may be of temporarily magnetisable material and, during their movement, pass stationary magnets, which may be permanent bar magnets or electro magnets, so as to be magnetised thereby. Similarly the fixed magnet (or magnets, as appropriate) may be of the permanet bar type, or electro magnets.

In the accompanying drawings:
FIGS. 1 and 2 diagramatically illustrate two phases of operation of one form of signal chopper in accordance with the invention, in the case where the polarities of the fixed and movable magnets, which are of the permanent bar type, are such as to close the circuit to be controlled against a bias provided by the resilience of the reeds of the contact unit, FIG. 2 being a section on the line 2—2 of FIG. 1;

Figure 1:
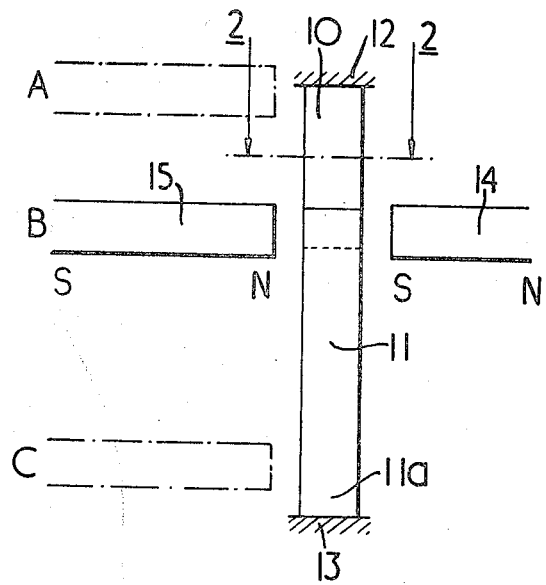
FIGS. 1A and 2A are further diagrams illustrating the same two phases of operation of another form of signal chopper in which the planes of the reeds are at right-angles to the planes they occupy in FIGS. 1 and 2.
Figure 2:
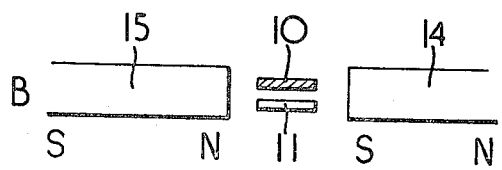

The general principle of the invention is illustrated by FIGS. 1 and 2 in each of which is shown a stationary contact unit comprising two resilient reeds 10, 11 secured at their outer ends to respective binding posts 12, 13 by which the contact unit can be connected in a circuit (not shown). The unfixed ends of the reeds overlap as shown, and the reeds are fashioned from metal which can be temporarily magnetised (e.g., mild steel). The resilience of one or both of the reeds normally biases them into a separated condition to open the circuit in which they are connected. On the right-hand side of the reeds is a fixed permanent bar magnet 14, and at the left-hand side of the reeds is a permanent bar magnet 15 which is movable to pass substantially along the lengths of the reeds. FIG. 1 also indicates at A, B and C three significant positions through which movable bar magnet 15 passes during its movement.

Referring now to FIG. 1, and assuming the presented poles of magnets 14 and 15 are unlike ones, the reeds 10 and 11, which are biased to their separated position by the resilience of a least one of them, fall directly in the flux path between magnets 14 and 15 when movable bar magnet 15 moves from chain-line position A to full-line position B, and the reeds will have like polarities induced in their overlapping ends to assist the resilience of the reeds in keeping them in separated relationship.

During is subsequent movement from position B to position C permanent magnet 15 passes the centre of the length of reed 11 and comes opposite the fixed end 11a of reed 11. In this position the polarity induced in the reed-end 11a by magnet 15 becomes reversed with the result that the induced polarity at its other end becomes unlike to the polarity induced in reed 10 by fixed magnet 14 and the reeds 10 and 11 are magnetically attracted to overcome the bias seperating them, and thus close the circuit in which the contact unit is included. After the permanent magnet 15 has moved beyond end 11a of reed 11, the said opposite polarity induced at end 11a of reed 11 disappears and the reeds separate to open the circuit, the separation of the overlapped ends being due to a combination of the resilience of the reeds and the fact that they are again subject to the action of fixed magnet 14 which induces like polarities in them.

In this way the first rectangular wave is completed in the circuit, its rise from zero potential to maximum occurring as reeds 10 and 11 first engage, the maximum potential being maintained whilst the reeds continue to be in engagement, and the potential in the circuit falling from maximum to zero when the reeds separate.

It will readily be understood that if the presented poles of magnets 14 and 15 are like ones they will still induce like poles in the overlapped ends of the reeds 10 and 11, when movable magnet 15 is in position B, so that the signal chopper of the inveniton would work in the way described above and with the same general result.

Figure 1A:
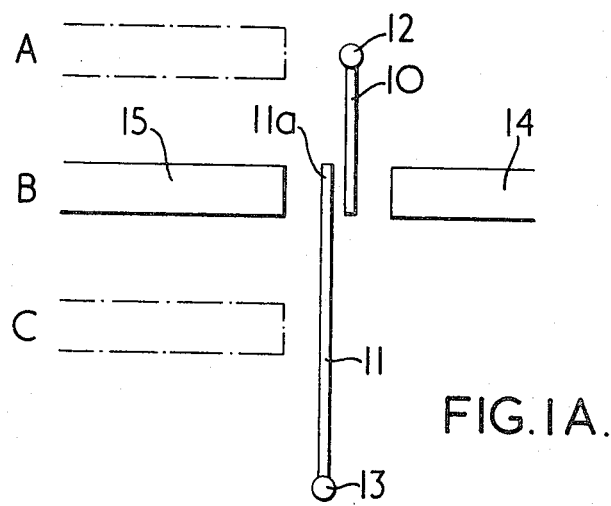
Figure 2A:
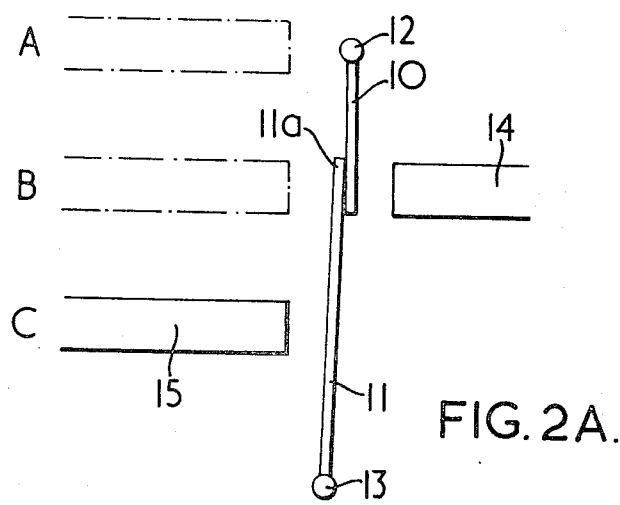

Also if the reeds 10 and 11 were to be arranged with their planes at right-angles to the axis of magnet 14 as shown in FIGS. 1A and 1B much the same results would be obtained. Similarly, the same, but a quicker chopping action would be obtained if the contact units are mounted for their widths, instead of their lengths to be swept by magnet 15.

Figure 3:
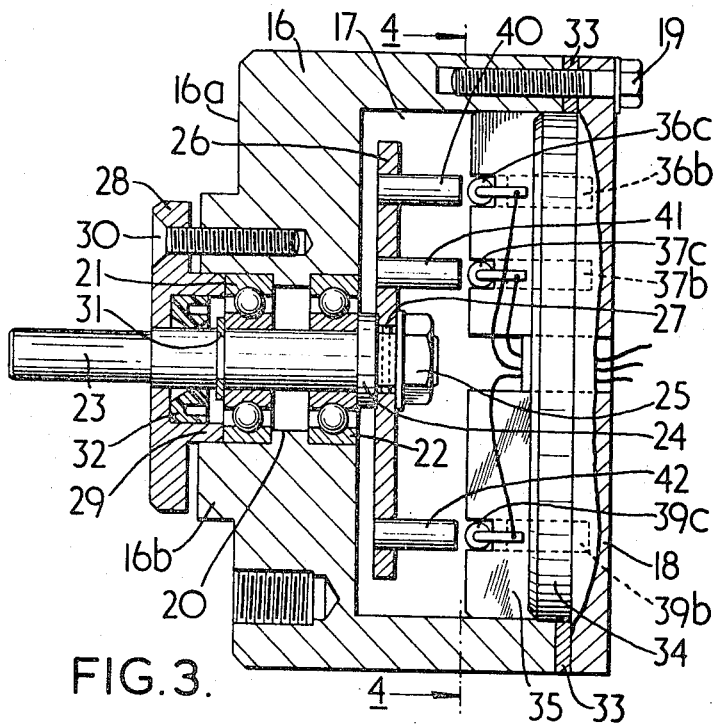
FIG. 3 is mainly a longitudinal section through one construction of the signal chopper.
Figure 4:
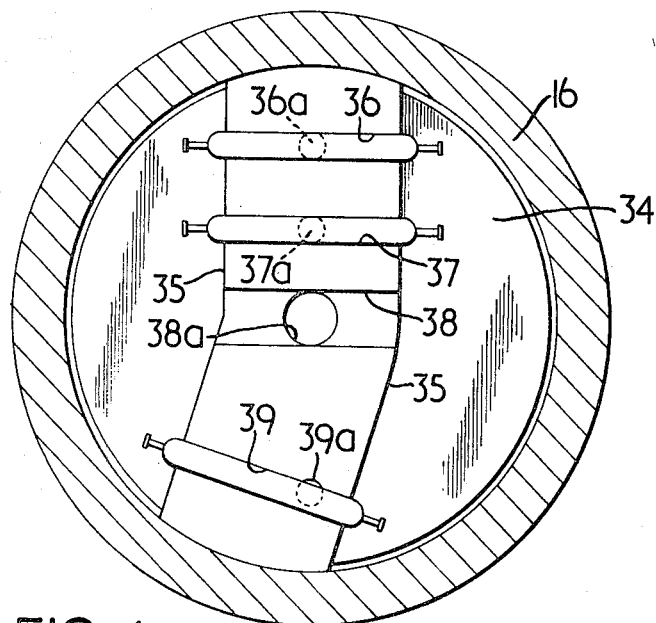
FIG. 4 is a sectional view on the line 4—4 of FIG. 3.

In the practical application of the signal chopper illustrated by FIGS. 3 and 4 it comprises a cylindrical body 16 having one end 16a closed and provided externally with an annular boss 16b, and defining an internal cylindrical chamber 17 having its open end closed by a plate 18 held fast to the body by a circle of screws, or studs with nuts, one of which is indicated at 19.

End wall 16a is provided with a bore 20 with larger-diameter bores at its ends whereby to provide steps to be abutted by a pair of axially-spaced bearings 21, 22 for a shaft 23. At its inner end the shaft is provided with a radial flange 24 against which a nut 25 clamps a disc 26 made rotationally fast with the shaft by a through-pin 27; and a closure plate 28 has a spigot 29 to abut bearing 21. A circle of screws 30 holds the closure plate in position on the body, and a circlip 31 on the shaft acting in conjunction with flange 24 locates the shaft bearings 21 and 22 against their respective steps at the ends of bore 20. An oil seal 32 is seated in a recess in the closure plate to act on the shaft under the axial compression due to the screws 30. At least the body 16, the plate 18 and the disc 26 are made of non-magnetic material, for example an aluminum alloy, and a washer 33 is inserted between plate 18 and body 16.

Plate 18 is provided with a cylindrical boss 34 which fits into the open end of chamber 17 of the body, and this boss is formed integrally with a raised portion 35 which, as can be seen from FIG. 4, consists of two substantially rectangular portions joined together at an inclined angle.

The raised portion 35 is shown provided with four transverse slots 36, 37, 38 and 39 from the bottoms of which extend respective perpendicular bores 36a, 37a, 38a and 39a. These bores, with the exception of 38a are blind and house respective permanent bar magnets 36b, 37b and 39b (see FIG. 3) which they hold stationary, and the slots (again with the exception of 38) house reed-type contact units 36c, 37c and 39c with their lengths directed chordwise of body 16. Bore 38a extends through plate 18 and serves for leads from the ends of the contact units to be passed to the outside for connection to the circuit to be controlled, the said leads being passed along the sides of the raised portion 35 and into the opposite ends of slot 38 for that purpose.

Mounted in disc 26 are three permanent bar magnets 40, 41 and 42, magnets 40 and 42 being at the same distance from the axis of shaft 23 but on opposite sides of the latter, and magnet 41 being at a shorter distance. The distance of magnets 40, 41 and 42 from the axis of shaft 23 are respectively the same as that of fixed magnets 36b, 37b and 39b.

It will be seen that during rotation of shaft 23 magnets 40, 41 and 42 respectively traverse contact units 36c, 37c and 39c from one end to the other, although in an arcuate path, and operate them in the manner previously described with reference to FIGS. 1 and 2 or FIGS. 1A and 2A.

By using magnets 40 and 42 in conjunction with fixed magnets 36b and 39b, which are 180 degrees apart two rectangular wave forms are produced during each revolution of shaft 23, and by using magnet 41 in conjunction with fixed magnet 37b a further circuit can be given one rectangular wave form for each rotation of the said shaft.

Although the construction illustrated by FIGS. 3 and 4 employs magnets which rotate, it will readily be understood that the movable magnets could be mounted on a rectilinearly movable slide coacting in a guide to which the fixed magnets are secured.

Pulse-chopping devices in accordance with the invention are capable of use in many fields, and are particularly adapted for operating a circuit containing a pulse-counter from signals received by virtue of the movement of the movable magnets relatively to the fixed ones.

Figure 5:
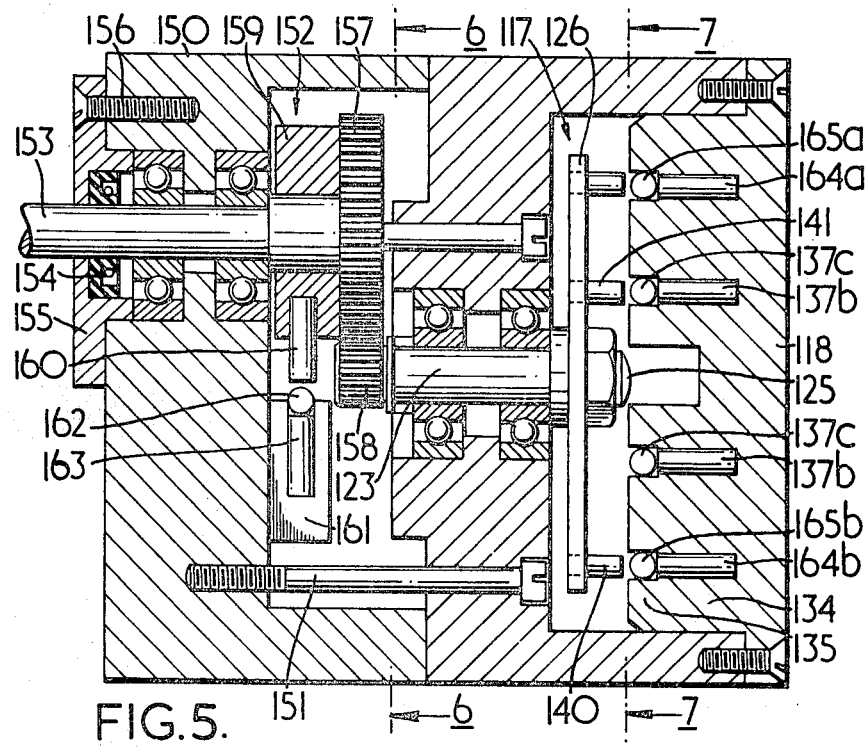
FIG. 5 is a longitudinal section of a signal chopper according to the present invention and adapted to provide signal chopping at different frequencies.
Figure 6:
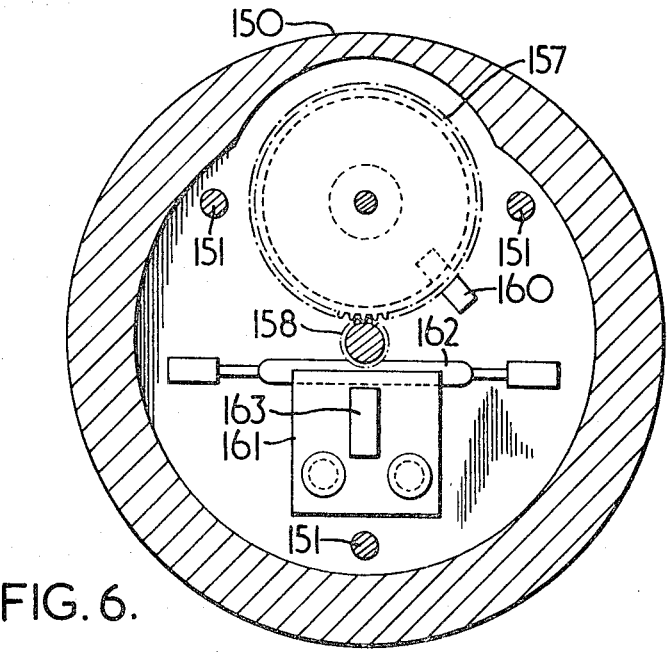
FIG. 6 is a section on the line 6—6 of FIG. 5.
Figure 7:
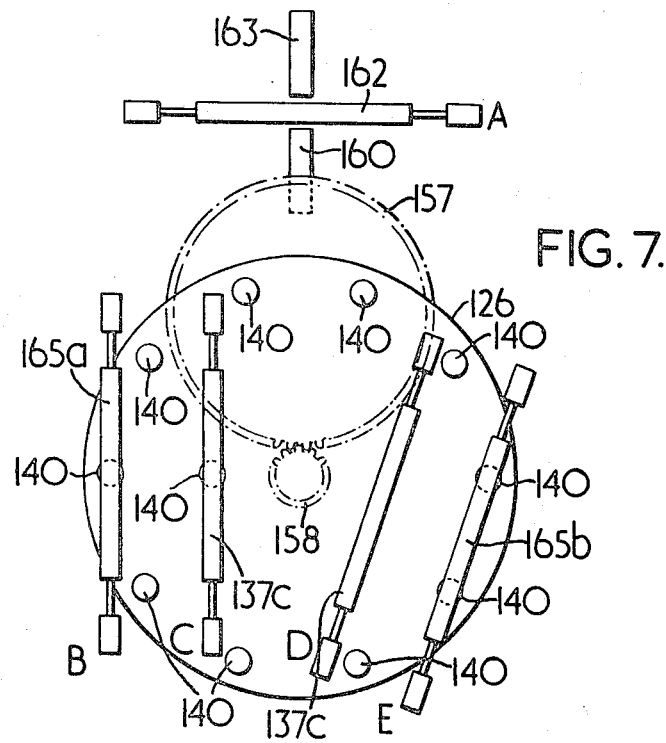
FIG. 7 is a section on the line 7—7 of FIG. 5.

The same reference numerals as in FIGS. 3 and 4, plus 100, are used to indicate the same elements in FIGS. 5, 6 and 7. Thus a nut 125 clamps a disc 126 up to a flange on a shaft 123 so that the disc is within an internal cylindrical chamber 117 of body 116. One end of the chamber is closed by an end plate 118 with a cylindrical boss 134 supporting a raised portion 135 provided with transverse slots, to receive contact units, and bores in which the fixed magnets are accommodated. At the opposite end of body 116 is a cylindrical member 150 which is held in position by three headed screws 151 to define a cylindrical chamber 152. The member 150 supports a driving shaft 153 in spaced ball bearings, and shaft 153 extends through an oil seal 154, and a cover plate 155 which is held in position by screws 156, to the outside for connection to the driving means (not shown).

The inner ends of shafts 153 and 123 are drivingly interconnected by a gear pair 157, 158 providing, for example, a speed-increasing ratio of 5 to 1, and shaft 153 also has a hub 159 supporting a radially-extending magnet 160. The member 150 has an internal raised portion 161 having a slot in which a contact unit 162 is accommodated, and the slot has a bore to hold a fixed magnet 163 in position. It will be seen that once in every revolution of shaft 153 contact unit 162 is operated to chop a signal in the electric circuit in which it is connected.

In the example illustrated disc 126 carries ten magnets 140 arranged in a circle coaxial with shaft 123 and equally spaced from each other so that any one of the magnets is diametrically opposite another. At the same radius as the circle of magnets 140 raised portion 135 carries two fixed magnets 164a, 164b at the bottom of respective slots which each accommodate a contact unit 165a, 165b.

Owing to the action of gear pair 157, 158 disc 126 is driven at five times the speed of shaft 153, and as it has ten movable magnets 140 each of which coacts with two fixed magnets 164a and 164b it produces one hundred chopping actions per revolution of shaft 153 provided that the contact units are so positioned that the engaged period of one occurs during the disengaged period of the other.

Nearer its centre, disc 126 also carries a single magnet 141 and at the same radius raised portion 135 carries two diametrically-opposed fixed magnets 137b at the bottom of respective slots which each accommodate a contact unit 137c. Thus, movable magnet 141 will cause the circuit to be controlled to be chopped twice during every revolution of disc 126, (i.e., ten times during every revolution of shaft 153).

Figure 8:
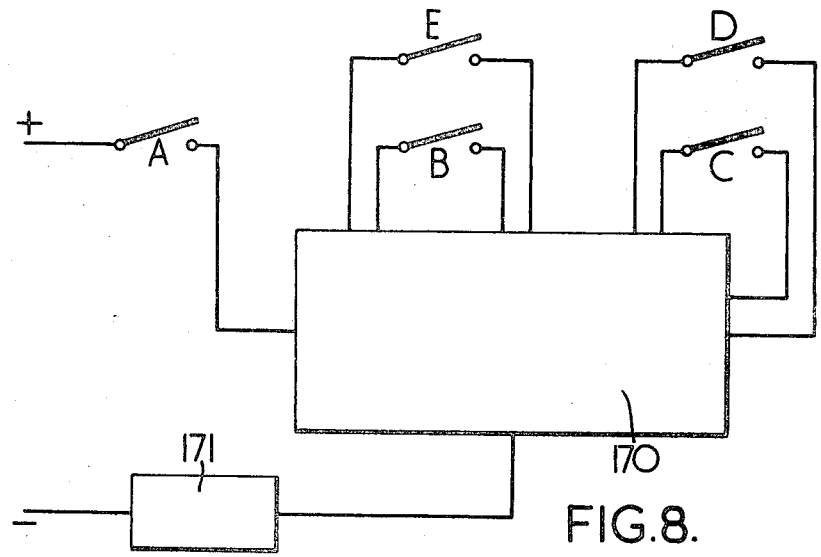
FIG. 8 is a circuit diagram.

The leads connecting each of the five contact units shown are connected to the circuit to be chopped through a pulse selection and integration device 170 as indicated in FIG. 8. In the latter contact unit 162 is indicated by a switch A, contact units 165a and 165b respectively by switches B and E, and the two contact units 137c by switches C and D. For convenience these letters are also shown on FIG. 7.

Device 170 can be of any suitable kind and can, for instance, include manually-operable switches which enable a desired algebraic sum of the chopping signals, which are continuously generated by the rotation of shaft 153, to be applied to the circuit which is to be controlled and is indicated at 171. The latter can be D.C. of A.C., and in the example given it will be seen that it can selectively be chopped at basic frequency by unit A, at ten times that frequency by units C and D or at a hundred times that frequency by units B and E.

Obviously disc 126 could cary more, or less than ten movable magnets 140, and it could also carry more than one coaxial circle of movable magnets at different radii to coact with companion circles of fixed magnets mounted in raised portion 135 with contact units in the space between them. Also it will be appreciated that the contact units could be selected so as to have their reeds biased into the engaged, instead of the disengaged position, provided the bias of their resiliency was not too strong for the magnetic action.

Figure 9:
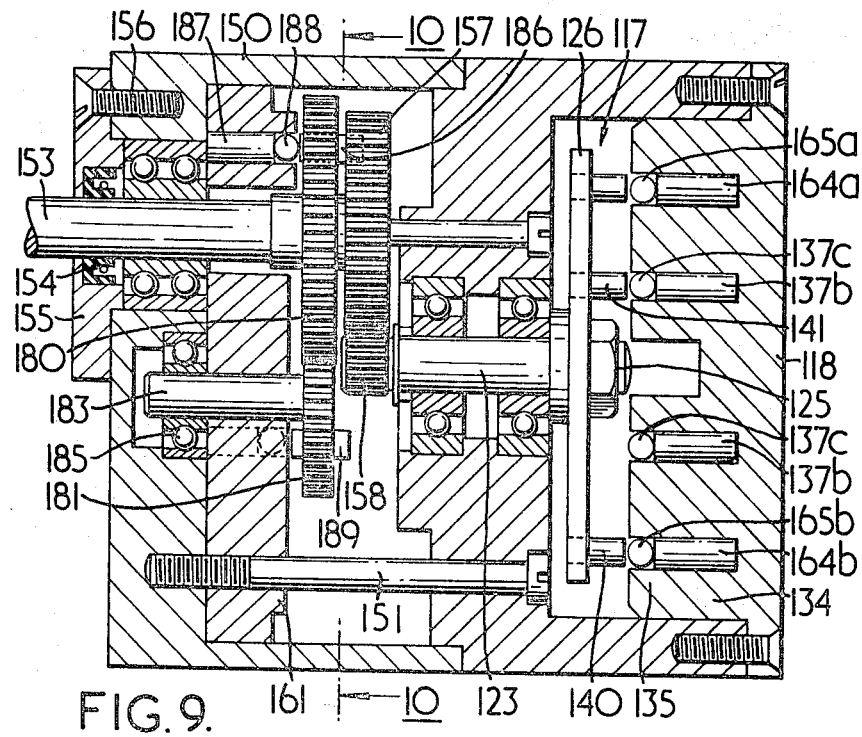
FIG. 9 is a view like FIG. 5 but of a modified form of signal chopper.
Figure 10:
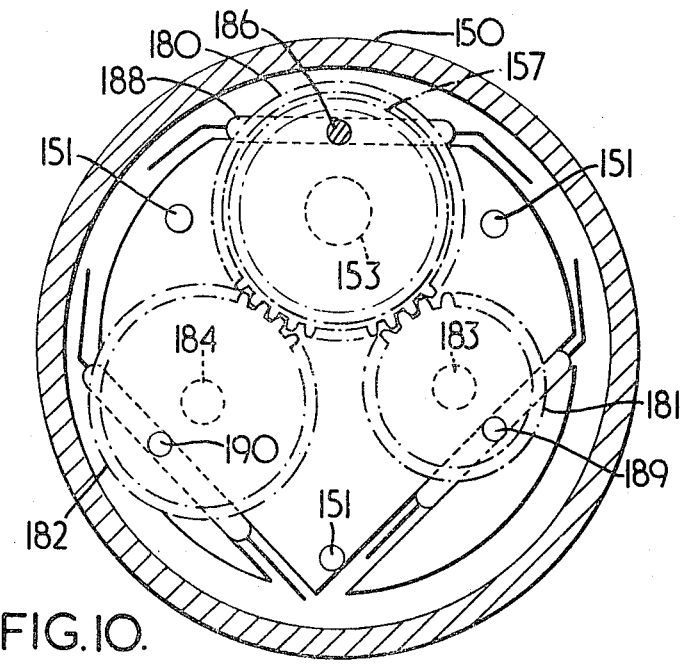
FIG. 10 is a section on the line 10—10 of FIG. 9.

Referring now to FIGS. 9 and 10 the portion shown in FIG. 9 to the right-hand side of section line 10—10 is the same as shown in FIG. 5 with the sole exception that the boss 134 and raised portion 135 are shown integral with each other.

On the left-hand side of the said section line in FIG. 9, however, input shaft 153 has a second and, in this instance, larger gear wheel 180 fast with it and axially spaced from gear wheel 157. Gear wheel 180 is meshed with each of two further gear wheels 181 and 182 which are of different sizes and are fast with respective shafts 183, 184 which extend through raised portion 161 to be supported in bearings 185.

Gear wheels 157 and 180 jointly support an axially-directed movable magnet 186 which coacts with a fixed magnet 187 in an axially-directed bore in raised portion 161 and the bore breaks into a chordwise slot of raised portion 161 to accommodate a contact unit 188. Similarly gear wheels 181 and 182 carry axially-directed movable magnets 189 and 190 to coact with respective fixed magnets and contact units which are supported in the same way as fixed magnet 187 and contact unit 188.

It will be appreciated that if there is only one movable magnet 186 jointly carried by wheels 157 and 180, and only one coacting fixed magnet 187 and contact unit 188 one pulse will be generated for each revolution of shaft 153, and that if each of wheels 181 and 182 carry one movable magnet for coaction with respective single fixed magnets and contact units, each will generate one pulse during one revolution of the respective wheel, and a number of pulses per revolution of shaft 153 dependently on the ratios of the wheels 180, 181 and 182. As, however, wheels 181 and 182 may be smaller or larger than wheel 180 they will rotate either faster or slower than shaft 153. If they rotate slower each will generate less than one pulse per revolution of shaft 153. On the other hand the parts of the signal chopper to the right of section line 10—10 will be generating pulses at a faster rate than the speed of shaft 153, so that with the apparatus of FIG. 9 there is scope for pulse generation at a frequency either higher or lower than the speed of the said shaft.

Advantage of this can be taken by having the gear wheels decimally related and for the various control units to actuate apparatus associated with a decimal indicator through relays.

While only two wheels 181 and 182 are shown as being driven from wheel 180, more or less than two could be so driven dependently on size and space considerations, and if it is desired to drive more wheels than can be accommodated round wheel 180 either further wheels could be driven by wheels 181 and 182, or shaft 153 could be provided with a third fixed gear wheel, which is axially spaced from gear wheels 157 and 180, to drive some of them.

It will be understood that whereas the FIG. 5 construction enables digerent multiples of pulses to be generated per revolution of shaft 153, and that the FIG. 9 construction additionally enables single pulses to be generated for different multiples of revolutions of the said shaft, the signal chopper of FIG. 9 could be modified by eliminating the FIG. 5 characteristic so that it would then only generate single pulses per multiples of revolutions of shaft 153.

Figure 11:
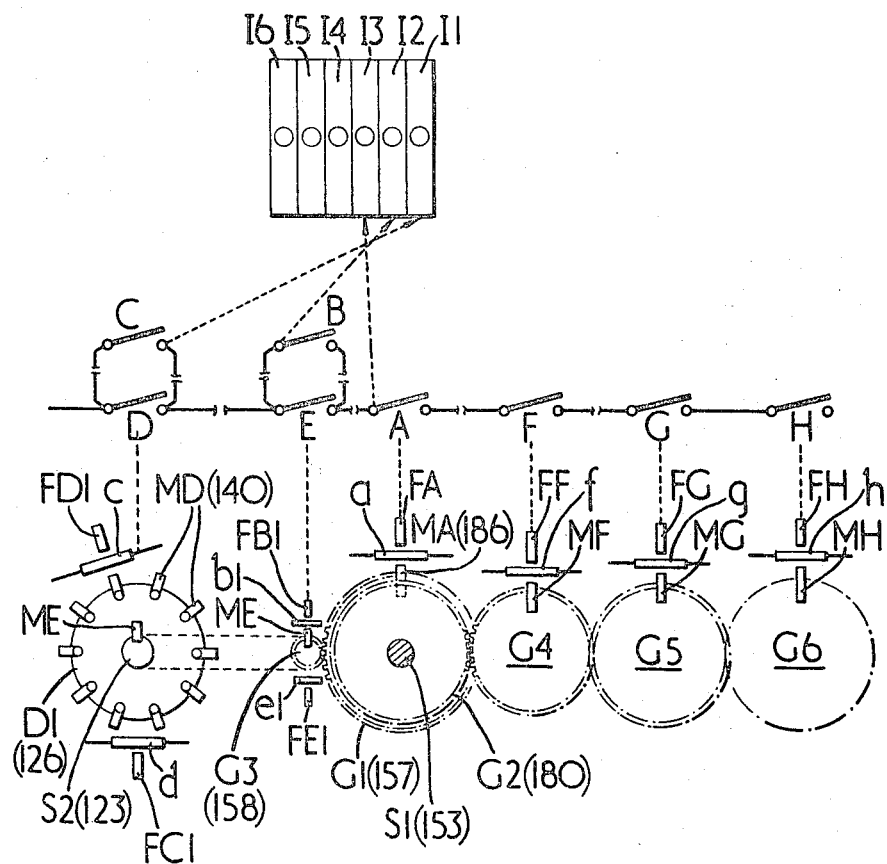
FIG. 11 is an exploded diagram illustrating the inter-relationship of various gear pairs and series-connected switches in the signal chopper shown in FIG. 9.

Reference is now directed to FIG. 11 which is an exploded, diagrammatic view of a signal chopper, similar to that shown in FIG. 9, to be applied to a control for the feed movement of a part of a machine tool to very fine limits of accuracy. For convenience the movable and fixed magnets are shown as being arranged radially and other parts are shown out of their normal planes.

Input shaft S1 (e.g., shaft 153 of FIG. 9) has fast with it two coaxial gear wheels G1 and G2 of unequal size (e.g., the gear wheels 157 and 180 of FIG. 9).

Although for the sake of simplicity certain of the elements in FIG. 9 have been given other reference symbols, they are suffixed by their FIG. 9 symbols in brackets. In the example shown gear wheel G1 (157) has 50 teeth and a gear wheel G2 (180) has 27 teeth, and they carry a moveable magnet MA (186).

Gear wheel G1 meshes a gear wheel G3 (158) which has 10 teeth and carries a moveable magnet ME, and gear wheel G3 is coaxially fast wtih a shaft S2 (123) on which is fixed a disc D1 (126) carrying 10 movable magnets MD (140). For convenience the movable magnet ME is also shown at (ME) on disc D1.

Gear wheel G2 (180) drives a chain of gear wheels G4, G5 and G6. Of these gear wheel G4 has 20 teeth and carries a movable magnet MF, gear wheel G5 has 25 teeth and carries a movable magnet MG, and gear wheel G6 has 23 teeth and carries a movable magnet MH. Instead of gear wheels G4, G5 and G6 being arranged in cascade as shown, they could all be driven directly from gear wheel G2.

The movable magnets MA, MF, MG and MH coact respectively with fixed magnets FA, FF, FG and FH, with respective contact units $a$, $f$, $g$ and $h$ between them for generating signal pulses for closing respective normally open relay switches A, F, G and H; while movable magnet ME coacts with two diametrically-opposed fixed magnets FB1 and FE1 associated with respective contact units $b1$ and $e1$ for generating signal pulses for closing each of two relay switches E and B alternatively for each revolution of gear wheel G3; and the 10 movable magnets MD coact with two fixed magnets FD1 and FC1 which are positioned relatively on opposite sides of a diameter of disc D1 such that when intervening control unit $c$ is actuated the opposite control unit $d$ is unactuated, and vice versa, so that they generate signals alternatively for closing relay switch C or D.

It will be seen that relay switch A will close once for every revolution of shaft S1, and that for every revolution of shaft S1 gear wheel G1 rotates shaft S2 five times. This means that for each revolution of shaft S1 relay switch A is closed once: relay switches B and E are each closed five times in 180 degrees out of phase relationship: and relay switches C and D are each closed fifty times alternately. Thus summarizing thus far, each revolution of shaft S1 gives one pulse to relay switch A, ten pulses jointly to relay switches B and E, and one hundred pulses jointly to relay switches C and D. The pulses generated by relay switch A, by relay switches $E+B$, and by relay switches $C+D$ are therefore decimally related, and can be shown on a numerical indicator I.

In the example shown the numerical indicator is of the kind having a plurality of coaxial drums bearing indicia on their peripheries and placed behind a viewing window which gives a decimally-related reading from all of the drums. The pulses generated by relay switch A are recorded on indicator drum I3 which has ten graduations each indicating one-tenth of an inch; the pulses generated jointly by relay switches B and E are recorded on indicator drum I2 which has ten graduations each indicating one-tenth of one-tenth of an inch, and the pulses generated jointly by relay switches C and D are recorded on indicating drum I1 which has ten graduations each indicating one-tenth of one-tenth of one-tenth of an inch so that drums I3, I2 and I1 respectively indicate tenths, hundredths and thousandths of an inch.

Figure 12:
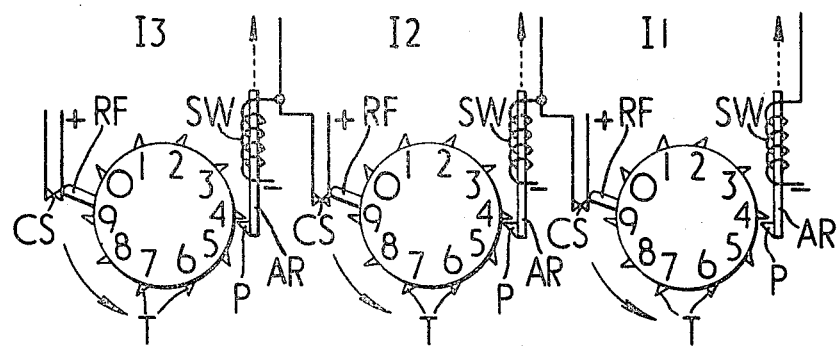
FIG. 12 illustrates one method of driving the indicator shown in FIG. 11.

The indicator drums in the example shown are now further described with reference to FIG. 12, in which three of the drums (e.g., I1, I2 and I3) are displayed side-by-side in a single plane for ease of illustration instead of being shown in their proper coaxial relationship. Each drum has ten equi-spaced ratchet teeth T by which it is turned by a respective pawl P at the foot of a respective vertical, gravity-biased armature AR when a coacting solenoid winding SW is energised by a pulse generated by the apparatus above described. The solenoid windings are series connected through normally open contact switches CS, and each drum has a radial finger RF which is so disposed to close the switch CS of the next senior (in the decimal sense) wheel when the drum carrying the finger has registered 9, but to allow the fingers again to separate when 0 is to be registered.

It will be seen that relay switches A, F, G and H are series connected, and that their respective pulse-producing gear wheels G2, G4, G5 and G6 have different numbers of teeth so that said relay switches will only ally be closed simultaneously when gear wheel G2 has turned so many times that the respective movable magnets MA, MF, MG and MH come into conjunction to generate simultaneous signal pulses to close their respective relay switches. For example, gear wheel G2 (27 tooth 16 D.P.), fixed to the input shaft, will drive gear wheel G4 and for every revolution of G4 will close contact device F once. Similarly, G5 will operate contact device G once every revolution. It will be seen that as G2, G4, G5 and G6 have different numbers of teeth the points taken up by the magnets on gears G4, G5 and G6 will alter to a set pattern for every revolution of G2. This pattern will hunt for a calculated number of revolutions on the input shaft until the original starting point recurs, that is, when contact devices A, F and G close simultaneously again.

To consider a single practical application of the device, it will be supposed that it is necessary to measure inches and decimal parts of an inch. Use will be made of electromechanical counters (e.g., these in FIG. 12) that operate one digit per pulse. These are so connected internally that a "carry" pulse is developed in each counter when moving from 9 to 0 as previously described. This carry pulse is used to operate the preceding decade one digit. The carry pulse is quite independent from any other pulse that may be fed directly to the counter. The input shaft S1 is mechanically connected to the machinery to be controlled, such, that one revolution is equivalent to movement through a distance of .1 inch. Contact device A may be connected to the counter number I3 and the distance travelled measured in .1 inch, the carry pulse operating every time the numerals move from 9 to 0. These pulses operate the preceding decade counters number I4 (in inches), number I5 (in 10 inches) and number I6 (in hundred inches). If it is desired to measure the travel in .01 inch, then switches $B+E$ operate counter number I2 directly. Similarly, to measure in .001 inch switches $C+D$ operate counter number I1, in each case the carry pulse will operate the preceding decade. Let it be supposed that the signal chopper is set up so that it is at zero or datum point, that is, when contact devices C, B, A, F, G and H are all closed. Contact devices E and D are isolated. If the contact device maintains contact over two teeth travel of G1, this will mean a contact arc of $$\frac{360}{50} \times 2 = 16.4 \text{ degrees}$$

but a 2-tooth travel on wheel G3, drievn by G1, will mean an arc of $$\frac{360}{10} \times 2 = 72 \text{ degrees}$$

As switch B will also have a contact arc of approximately 16.4 degrees, and if switch A is connected in series with this it will be seen that the total closure arc of the input shaft is now $$\frac{164}{5} = 3.2 \text{ degrees}$$

Similarly if switch C is in series with B and A, for every operation of B there will be 10 pulses from C so that the operating arc of $$C = \frac{3.2}{10} = .32 \text{ degrees}$$

of the input shaft, but the mark to space ratio of the closure time of C or D is 3 to 1 so that the actual closure arc is $$\frac{.32}{3} = .104 \text{ degrees}$$

of the input shaft.

If we now consider the practical dimensions of the gears G2, G4 and G5, making G2 27 teeth 16 D.P., G4 16 teeth 16 D.P. and G5 25 teeth 16 D.P. the magnets on these gears will hunt for 100 revolutions of the input shaft before simultaneous closure of switches A, F and G recurs. This train of gears and contact devices (e.g. G6 and $h$ on the drawing) may be extended indefinitely to cover an infinite range of revolutions per pulse. A practical application of the latter is to choose an extremely wide ratio so that the pulse can occur only once over the travel of the machine, and to use this pulse for a datum. If this is switched through the preceding switches this datum can be set to .001 inch.

In conclusion it should be noted that the device need not necessarily be used on counting devices. It is quite possible to use it in many forms, punched tape, magnetic tape, plug board, binary analysis or even the direct transposing of drawing to machining operations.

What I claim as my invention and desire to secure by Letters Patent of the United States is:

1. A magnetically-acting, electric signal chopper comprising a movable magnet and a fixed magnet, said movable magnet arranged to be moved bodily in a direction perpendicular to its N–S axis and to the N–S axis of said fixed magnet with which it becomes aligned with a space between them during its movement, and a contact unit, said contact unit having contacts in the form of substantially aligned reeds of temporarily magnetisable material which have their one ends overlapping and biased apart and their other ends fixed and for inclusion in an electric circuit carrying the signal to be chopped, said contact unit being arranged in the space between the adjacent ends of the fixed and movable magnets and positioned so as to be swept by the flux from the movable magnet so as to be opened and closed by the interaction of the fluxes of the two magnets with the biased reeds.

2. A signal chopper, according to claim 1, in which there is more than one movable magnet, the movable magnets being spaced laterally of their direction of movement and coacting with respective fixed magnets with respective ones of the contact units between them.

3. A signal chopper, according to claim 2, in which different numbers of movable magnets are mounted for simultaneous movement in two or more laterally spaced paths, with associated fixed magnets and respective contact units in the spaces between the fixed and associated movable magnets, and a pulse selection and integrating device is connected between the signal chopper and the electric circuit carrying the signal to be chopped.

4. A signal chopper, according to claim 3, in which each movable magnet is supported from a rotor and the reeds of each coacting contact unit are parallel to a tangent to the path of the movable magnet with which they coact.

5. A signal chopper, according to claim 1, in which the movable magnet is of the permanent bar type.

6. A signal chopper, according to claim 1, in which the fixed magnet is of the permanent bar type.

7. A magnetically-acting, electric signal chopper comprising movable magnets and fixed magnets, said movable magnets arranged to be moved bodily in a direction perpendicular to their N–S axes and to the N–S axes of said fixed magnets with which they become aligned with a space between them during their movement, and contact units, said contact units each having contacts in the form of substantially aligned reeds of temporarily magnetisable material which have their one ends overlapping and biased apart and their other ends fixed and for inclusion in an electric circuit carrying the signal to be chopped, said contact units being arranged in the spaces between the adjacent ends of the respective fixed and movable magnets and positioned so as to be swept by the flux from the respective movable magnets so as to be opened and closed by the interaction of the fluxes of the fixed and movable magnets with the biased reeds, movable magnets being supported from a rotor for simultaneous movement in laterally spaced paths with associated fixed magnets and respective contact units in the spaces between the fixed and associated movable magnets, the reeds of the coacting contact units being parallel to a tangent to the path of the movable magnet with which they coact, the signal chopper further comprising speed increasing gearing for driving the rotor, of which gearing at least one wheel drives a further movable magnet, with an associated fixed magnet and a contact unit in the space between them, at a slower speed than the rotor and feeds the electric circuit to be chopped through a pulse selection and integration circuit.

8. A magnetically-acting, electric signal chopper comprising movable magnets and fixed magnets, said movable magnets arranged to be moved bodily in a direction perpendicular to their N–S axes and to the N–S axes of said fixed magnets with which they become aligned with a space between them during their movement, and contact units, said contact units each having contacts in the form of substantially aligned reeds of temporarily magnetisable material which have their one ends overlapping and biased apart and their other ends fixed and for inclusion in an electric circuit carrying the signal to be chopped, said contact units being arranged in the spaces between the adjacent ends of the respective fixed and movable magnets and positioned so as to be swept by the flux from the respective movable magnets so as to be opened and closed by the interaction of the fluxes of the fixed and movable magnets with the biased reeds, movable magnets being supported from a rotor for simultaneous movement in laterally spaced paths with associated fixed magnets and respective contact units in the spaces between the fixed and associated movable magnets, the reeds of the coacting contact units being parallel to a tangent to the path of the movable magnet with which they coact, the signal chopper further comprising a driven input shaft which is connected to drive the output wheel of at least one planar gear pair at a different speed, and each wheel of the pair has at least one of the movable magnets to coact with one or more fixed magnets during its rotation, with respective contact units in the space between them.

9. A signal chopper, according to claim 8 and in the case where there is more than one gear pair, in which the gear pairs are constituted by a common input gear wheel fast with the shaft and individual output gear wheels meshed with it at different positions along its periphery.

10. A signal chopper, according to claim 9, in which the output gear wheel of at least one of the gear pairs is arranged to drive an additional unequal gear wheel, provided with a movable magnet to coact with a respective fixed magnet, with contact units in the space between them, to provide pulses at different frequencies.

11. A signal chopper, according to claim 9, in which the output gear wheel of at least one of the gear pairs is arranged to drive an additional train of gear wheels which are of unequal sizes and provided with respective movable magnets to coact with respective fixed magnets, with contact units in the space between them, to provide pulses at different frequencies.

12. An electric signal chopper comprising fixed contact units having contacts for inclusion in an electric circuit carrying the signal to be chopped and bodily movable operating members operable to actuate the contacts between open and closed positions, a first operating member being mounted for bodily movement along one circular path adjacent at least one associated contact unit, and a second operating member being mounted for bodily movement along a further circular path radially spaced from said one path simultaneously with the first operating member, said further path being adjacent further contact units, the operating members being arranged to pass adjacent to the associated contact units to act on the units and actuate the contacts.

13. An electric signal chopper, comprising fixed contact units having contacts for inclusion in an electric circuit carrying the signal to be chopped, and movable operating members operable to actuate the contacts between open and closed positions, a first operating member being mounted for movement along one path adjacent at least one associated contact unit, and a second operating member being mounted for movement along a further path spaced from said one path simultaneously with the first operating member, said further path being adjacent at least one further contact unit, the operating members being arranged to pass adjacent to the associated contact units to act on the units and actuate the contacts; the chopper further comprising a rotor from which said first and second movable members are supported and the rotor is driven through speed-increasing gearing of which at least one wheel drives a further movable member, with an associated fixed contact unit adjacent the path of movement of the further movable member, at a slower speed than the rotor, and feeds an electric circuit to be chopped through a pulse selection and integration device.

14. A signal chopper, according to claim 13, having a driven input shaft which is connected to drive the output wheel of at least one planar gear pair at a different speed, and each wheel of the pair has at least one movable member to coact with one or more fixed contact units during its rotation.

15. A signal chopper, according to claim 14, and in the case where there is more than one gear pair, in which the gear pairs are constituted by a common input gear wheel fast with the shaft and individual output gear wheels meshed with it at different positions along its periphery.

16. A signal chopper, according to claim 14, in which the output gear wheel of at least one of the gear pairs is arranged to drive an additional train of gear wheels which are of unequal sizes and provided with respective movable members to coact with respective fixed contact units to provide pulses at different frequencies.

17. A signal chopper, according to claim 16, in which the movable operating members are movable magnets and the contact units are each associated with a fixed magnet, the contact units having contacts in the form of substantially aligned reeds of temporarily magnetisable material which have their one ends overlapping and biased apart and their other ends fixed, the contact units being arranged in the space between the fixed and movable magnets.

References Cited

UNITED STATES PATENTS

| 3,233,121 | 2/1966 | Chou | 307—243 |
|---|---|---|---|
| 3,292,121 | 12/1966 | Bergstrasser | 335—153 |

FOREIGN PATENTS

| 649,838 | 6/1964 | Belgium. |
|---|---|---|
| 1,169,559 | 5/1964 | Germany. |

HAROLD BROOME, Primary Examiner

U.S. Cl. X.R.

335—206